United States Patent [19]
Ramanujan

[11] Patent Number: 5,341,491
[45] Date of Patent: Aug. 23, 1994

[54] APPARATUS AND METHOD FOR ENSURING THAT LOCK REQUESTS ARE SERVICED IN A MULTIPROCESSOR SYSTEM

[75] Inventor: Raj Ramanujan, Leominster, Mass.

[73] Assignee: Digital Equipment Corporation, Maynard, Mass.

[21] Appl. No.: 141,427

[22] Filed: Oct. 22, 1993

Related U.S. Application Data

[63] Continuation of Ser. No. 546,365, Jun. 29, 1990, abandoned.

[51] Int. Cl.5 .............................................. G06F 12/14
[52] U.S. Cl. ............................ 395/425; 366/DIG. 1; 366/244.3; 366/246.8; 366/228.1; 366/230.2; 366/280.8; 366/284.1; 366/284.5
[58] Field of Search .............................. 395/400, 425; 364/200 MS File, 900 MS File

[56] References Cited

U.S. PATENT DOCUMENTS

| | | | |
|---|---|---|---|
| 4,897,786 | 1/1990 | Pimm et al. | 395/325 |
| 4,937,733 | 6/1990 | Gillett, Jr. et al. | 395/325 |
| 5,050,066 | 9/1991 | Myers et al. | 395/575 |
| 5,060,144 | 10/1991 | Sipple et al. | 395/650 |
| 5,068,781 | 11/1991 | Gillett, Jr. et al. | 395/325 |
| 5,161,227 | 11/1992 | Dias et al. | 395/650 |
| 5,175,837 | 12/1992 | Arnold et al. | 395/425 |

OTHER PUBLICATIONS

Kelter, Udo, Information Systems "Deadlock-Freedom of Large Transactions In Object Management Systems," vol. 14, No. 2, pp. 175–180, (1989) Dortmund, Germany.

Anderson et al., Performance Evaluation Review, "The Performance Implications of Thread Management Alternatives For Stored Memory Multiprocessors," vol. 17, No. 1, pp. 49–60, (May 1989) Berkeley, USA.

*Primary Examiner*—Joseph L. Dixon
*Assistant Examiner*—Hiep T. Nguyen
*Attorney, Agent, or Firm*—Richard J. Paciulan; Denis C. Maloney

[57] ABSTRACT

A lockout avoidance circuit is provided for a plurality of nodes which generate lock requests for a shared resource such as a memory location. The circuit insures that lock requests are eventually satisfied. A lock queue includes a plurality of registers pipelined together. Lock requests only enter the lock queue if they are refused access to a shared resource a predetermined number of times. A first register is the head of the queue and the last register is the bottom of the queue. An enabling circuit allows the queue to store in the registers lock requests received from the different nodes in the order in which they are initially refused service. The enabling circuit operates the queue by pushing the stored lock requests toward the head of the queue each time the head entry in the queue is serviced. The lockout avoidance circuit is implemented at each level of the system wherein a lockout condition can occur.

22 Claims, 5 Drawing Sheets

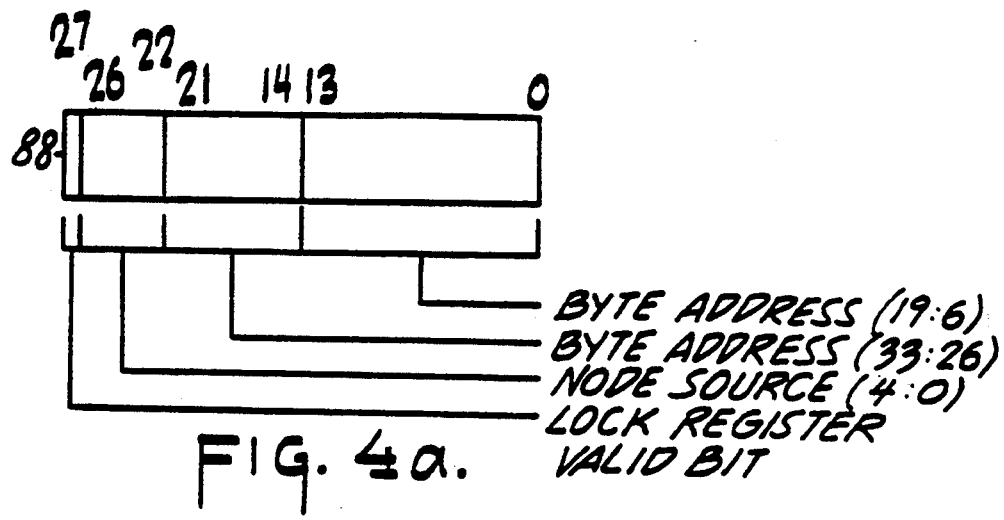
FIG. 4a.
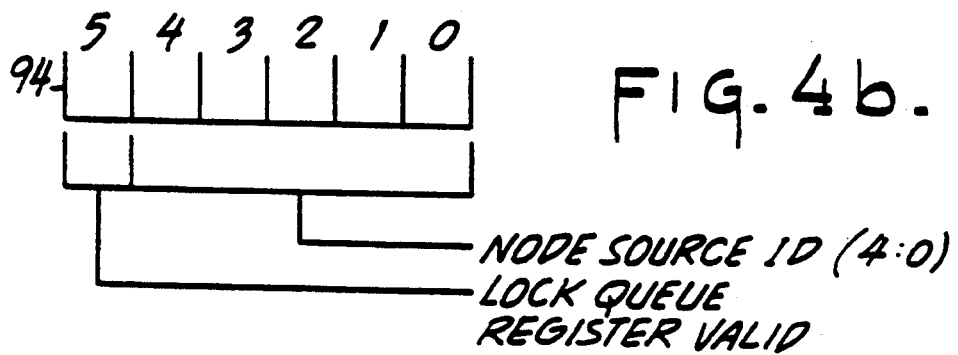
FIG. 4b.
FIG. 5.

APPARATUS AND METHOD FOR ENSURING THAT LOCK REQUESTS ARE SERVICED IN A MULTIPROCESSOR SYSTEM

This application is a continuation of application Ser. No. 07/546,365, filed Jun. 29, 1990.

FIELD OF THE INVENTION

This invention relates to a computer system and, more particularly, to a lock out avoidance mechanism used in the computer system to prevent a situation wherein lock requests generated by the system devices are never serviced by the system.

BACKGROUND OF THE INVENTION

In multiprocessor systems, any of a number of processors or devices may desire exclusive access to a shared resource in the system. These shared resources can be, for example, a memory location such as a block of memory, longword, byte, etc. In order to obtain exclusive rights to the memory location, the processor generates an interlock signal in the form of a lock request which will lock that particular location in memory to a device requesting access and thus deny any other processor or device interlocked access to the particular memory location. Once the processor finishes with the particular memory location, an unlock request is generated to unlock the location, thus again allowing general access.

The use of lock requests occurs most often when processors share a resource such as a particular data structure or table stored in the memory. In order to gain access to such shared resource, the processors synchronize using interlocked operation in memory locations sometimes referred to as semaphores. Because only one processor is granted exclusive access to the semaphore any operations on the shared resource is thus serialized. It is possible that multiple processors wishing to access the resource simultaneously may generate lock requests for the semaphore. For example, if a system includes four processors (CPUs) or nodes from which lock requests can originate, it is possible for two or more processors to desire interlocked access to the same location at the same time. In this instance, one of the requests is refused and the refused node receives a retry signal instructing it to retry the lock request. Typically, each of the CPUs or the memory itself must keep track of the locked memory locations, status of any pending lock requests, etc. In other systems using a central arbiter to receive the lock requests, the tracking of the lock requests occurs at the central arbiter. In either system it is possible, when multiple nodes require locked access to the same memory location, for one or more nodes to be denied access forever. This condition is referred to as lockout.

Further, many systems include several levels of processing, with each level having multiple sources which can generate lock requests. Therefore, lock out may occur at any level in the system wherein multiple lock requests are generated. In previous system designs the lock out condition was resolved either by throttling all requestors except the node locked out when this condition was detected by the system or by forcing queuing of all locked requests which enforced sequentiality. This resulted in either a complex lockout avoidance protocol or slowed the system performance with respect to lock requests.

SUMMARY OF THE INVENTION

The present invention overcomes these problems by providing an efficient and simple hierarchical system of lock out avoidance mechanisms for use in systems having central locations for receiving the lock requests. To avoid lock out each of the mechanisms uses a centralized queueing structure called a lock queue. The centralized queueing mechanism is used because all interlock signals, e.g. lock requests and unlock requests, are received at the central location. The lock queue contains as many entries as there are possible nodes from which lock requests can originate, but no one entry is specifically tied to any node. Each entry in the lock queue contains a valid indication field and a node identification (I.D.) field. The valid indication field indicates whether the lock request is valid and the node I.D. field stores the identification of the node generating the lock request. The lock queue further has a head and a tail entry. The head points to the first entry, i.e., the highest priority entry, in the queue and the tail points to the first available entry in the lock queue. Each time the head of the queue is serviced, i.e., its lock request is satisfied, the head of the queue moves to the next entry in line. If one of the nodes already has an entry in the queue which has not yet been serviced, then subsequent lock requests from that node will be written into the same place in the lock queue. This is possible because the entries only contain the node ID and not the request itself. In this manner, the lock queue need only contain a number of entries corresponding to the number of nodes from which lock requests can originate.

The lock queue is usually empty and lock requests, from the various nodes passing through the central location, only enter the lock queue, if, after a predetermined number of tries, they are unable to gain access to a particular resource. For example, assume that a lock request from node 0 is refused access because the particular memory location was already locked or a register for allowing the lock request was not available, then the central location increments a refusal counter for the particular node. When the node, in this case node 0, retries its lock request, it will then again be either refused or granted access. If the lock request is refused a predetermined consecutive number of times while the lock queue is empty, then the node's I.D. will be stored at the head of the lock queue along with an indication of its validity.

Because the lock queue is no longer empty, any subsequent lock requests from any other node in the system will be refused access to any location and will immediately enter the lock queue in the order in which they are serviced by the central location. When a lock request at the head of the queue is serviced, then the next waiting request in the queue becomes the head of the queue.

In this manner, a lock out avoidance mechanism is operated such that if the lock queue is empty, it is difficult to enter the lock queue because a particular lock request must be refused the predetermined number of times before the lock request may enter the queue. Once in the queue, the lock requests are serviced serially which slows down the system. Therefore, the lock queue is operated to try to keep the queue empty by using the refusal counter. This operation ensures that the queue is usually empty. However, once the lock queue is no longer empty, all future lock requests are serviced strictly by their queue position. This operation continues until the lock queue again becomes empty.

Thus, the lock out avoidance mechanism at this level guarantees that each node will eventually have its lock request serviced.

The present invention provides a similar lock out avoidance scheme at each level in the system wherein a lock out condition can occur. For example, a typical multiprocessor system has a number of hierarchical levels. A first level has each of the processors in the system vying for access to the system bus. The second level has devices within each processor, such as a processor chip and an interface chip, vying for access to the processor's bus. Further levels can include devices coupling through the interface chip which try to access the interface bus, etc.

Assuming in our second level that for each processor of a multiprocessor system, there are two sources of lock requests, i.e., the processor chip itself and other devices interfacing therewith, then the lock out avoidance mechanism at this level consists of a two entry queue. Each entry in the queue contains two fields: 1) an entry valid and 2) source I.D. As long as the lock requests are not refused, the queue will remain empty. However, if a lock request from, for example, the processor chip is refused, then that lock request immediately enters the head of the queue. From that point onward until the request is granted, only the processor chip's lock requests can be output onto a bus to the central location. If another device generates a lock request at the second level, the lock request enters the queue behind the processor chip's entry and is internally refused by the processor. When the head of the queue's lock request is eventually satisfied, i.e., the processor chip is finally granted access, the entry is popped from the queue and the next device becomes the head of the queue. Thus, a lock out avoidance mechanism is provided at a second level in the system.

As a result of providing a lock out avoidance mechanism at each level wherein multiple sources can generate lock requests and hence lock outs could occur, the present invention guarantees that every lock request generated in the system will eventually be serviced.

BRIEF DESCRIPTION OF THE DRAWINGS

FIG. 4a is a block diagram of a lock register entry.

FIG. 4b is a diagram of an entry in the lock queue.

FIG. 5 is a diagram of the lock queue at the processor level in the system of FIG. 1.

DETAILED DESCRIPTION

System Overview

Figure 1:
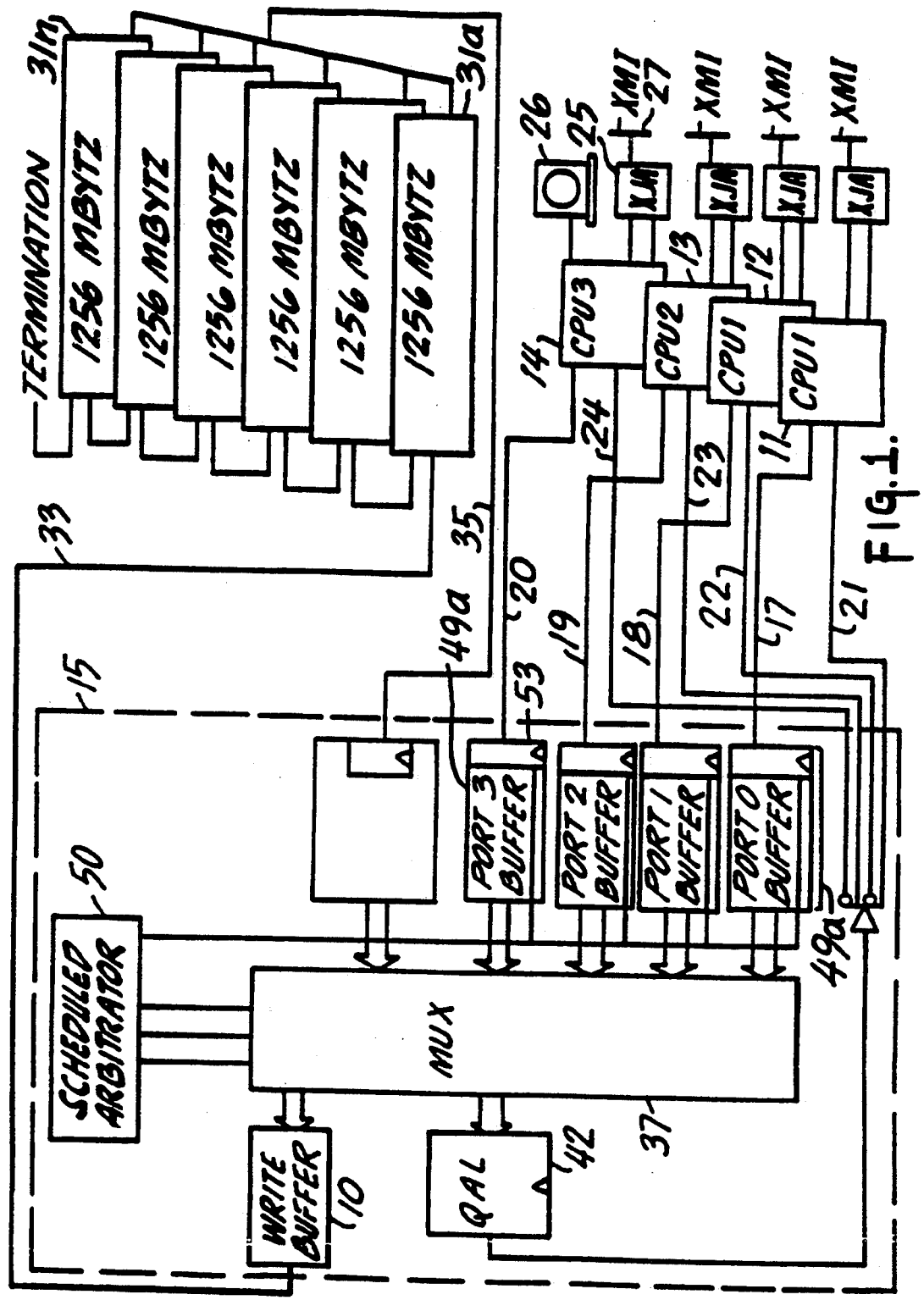
FIG. 1 is a block diagram of a system advantageously employing the present invention.

FIG. 1 is a block diagram of a system which advantageously uses the present invention. As illustrated, there are four CPU's 0-3 indicated as blocks 11-14, respectively. These blocks 11-14 are coupled to a central unit, indicated by dashed line 15, to be described in more detail below. Each of the CPUs 11-14 is connected to the central unit 15 over a point to point bus, hereinafter referred to as an E-BUS TA, the E-BUS TA for CPU 0 being designated as 17, the corresponding bus for CPU 1 as 18, and so on accordingly. Each CPU 11-14 also receives output on an E-BUS FA from the central unit 15, the four buses being designated respectively as 21 through 24. Also shown in the illustrated embodiment, each of the CPUs 11-14 communicates with a bus adaptor XJA 25 over two 16-bit buses, i.e., an input and an output bus, with the bus adaptor 25 converting this information to another bus 27. A console 26 is associated with at least one of the CPUs 11-14.

The system also includes a shared memory made up of a plurality of memory modules 31a to 31n which are coupled to the central unit 15 over what is designated A-BUS FA 33 and what is designated as A-BUS TA 35. The A-BUS FA 33 carries outputs from the central unit 15 to the memory modules and the bus 35 provides memory information to the central unit 15. In the illustrated embodiment, buses 17-24 and 33 are 32-bit parallel buses and bus 35 is a 64-bit parallel bus. The E-BUSES operate at 8 ns timing and the A-BUSES at 16 ns in this embodiment.

FIG. 1 further shows a configuration for the central unit 15. A multiplexer, designated generally by 37, is provided in the central unit 15. As will be shown below, the multiplexer 37 is made up of several multiplexers advantageously coupled together. At the inputs to the multiplexer 37 is a port logic block 49 composed of port logic units 49a. Each port logic unit 49a includes a buffer 53 for each input port, i.e. each E-BUS TA 17-20. Each of the buffers 53 in the port logic units 49a can hold three words for each of buses 17-20 from CPUs 11-14. Outputs from the buffers 53 are coupled into scheduler arbitrator logic 50 which arbitration logic 50 provides outputs to control multiplexer 37. One of the general outputs of MUX 37 is fed to a write buffer 10 which is coupled to memory modules 31a-n via the bus 33.

Figure 2:
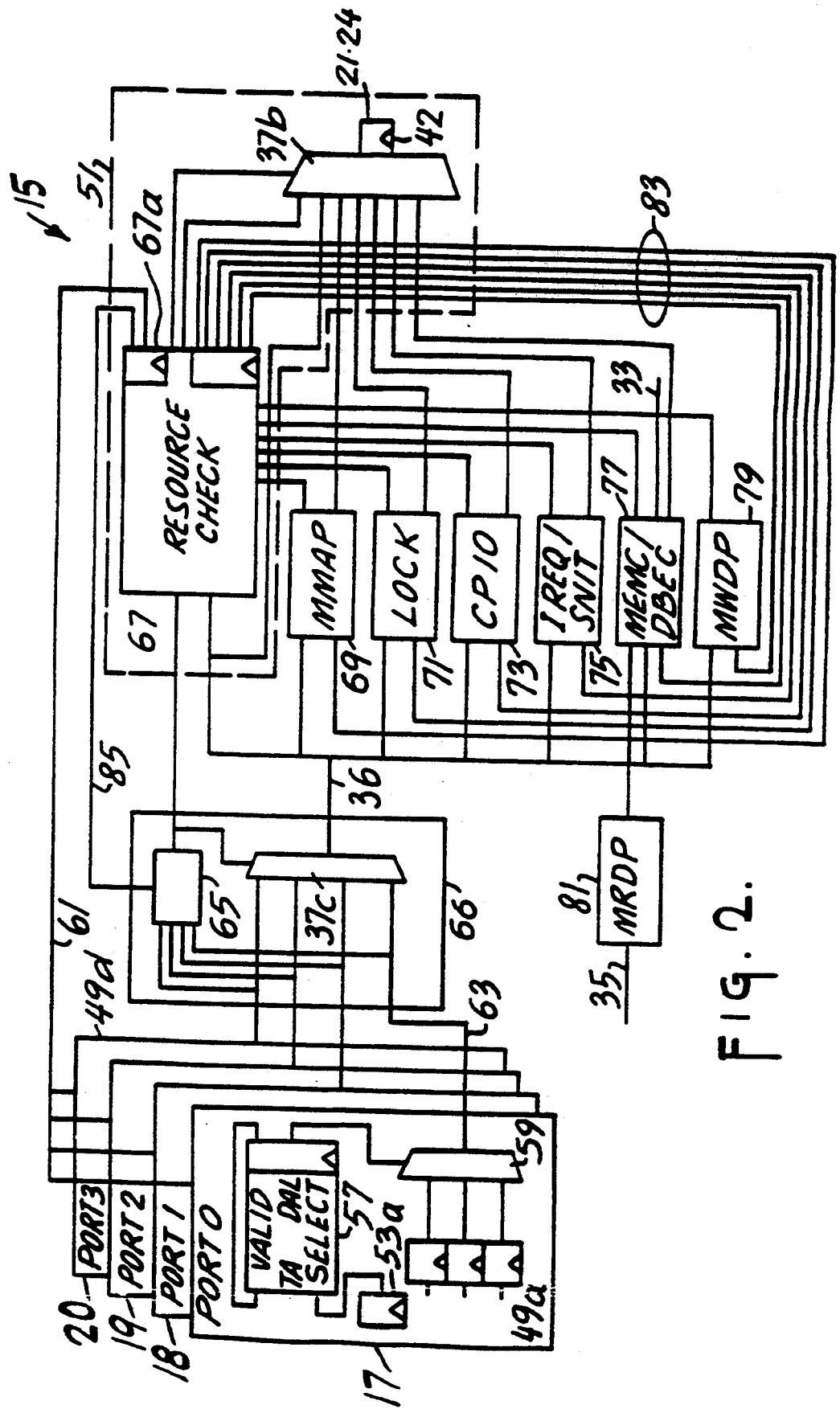
FIG. 2 is a block diagram of the central arbiter including the lock logic of the present invention.

FIG. 2 is a more detailed block diagram of the central unit 15 of FIG. 1 showing a port select logic 65 and resource check 67 which together compose the scheduler/arbitrator 50 of FIG. 1 and its relationship to other elements of the system. Port select logic 65 is combined with multiplexer 37a to form scheduling logic 66. Resource check logic 67 combines with MUX 37b and state device 42 to form arbitrator 51. As illustrated, the buses 17-20 are inputs to the port logic 49. Each CPU is considered a system port. Individual port logic units, designated 49a-d, are provided for each of the buses 17-20. The bus information enters a state device 53a, forming part of the buffer 53 of FIG. 1, from which it is directed to buffer 53b, also forming part of buffer 53 in FIG. 1. The buffer 53b has storage space for three words. The output from the state device 53a is also provided into validity logic 57. The validity logic 57 controls a port multiplexer 59. The validity logic 57 also receives a port grant signal on line 61 from the arbitrator 51. Validity logic 57 determines whether or not a command or data are valid and which of the data, either in the buffers 53b or on the input line from the state device 53a, is to be switched out onto an output line 63 which provides one of the inputs to a multiplexer 37a (part of MUX 37 in FIG. 1). The outputs on lines 63 from the port multiplexers 59 are the inputs to the multiplexer 37a. Associated with the multiplexer 37a is port selection or scheduling logic 65. In response to outputs from the arbitrator 51, and its own logic, the port select logic 65 selects one of the four input lines 63 to be coupled to the output of multiplexer 37a. This, of course, must be coordinated with the operation of the logic 57 which is switching outputs onto the lines 63. The port select logic 65 basically operates so as to provide the four ports providing their inputs on line 63 a round robin access to bus 36.

Bus 36 is an input to a resource check block 67 which is part of the arbitrator 51. Bus 36 is also an input to the multiplexer 37b (also part of MUX 37 in FIG. 1). Bus 36 is also coupled to a memory map unit ("MMAP") 69, lock logic unit ("LOCK") 71, input/output unit ("CPIO") 73, interrupt request unit ("IREQ/SNIT") 75, memory controller ("MEMC/DBEC") 77 and memory write data path unit ("MWDP") 79. Each of the blocks 69, 71, 73, 75 and 77 also provide inputs to the multiplexer 37b. In addition, the resource check 67 can provide an ARB command to the multiplexer 37b.

The previously described A-BUS TA is provided as an input to a memory read data path 81 which provides its input into the memory controller, i.e., the MEMC/DEBC 77, the output of which is the memory controller refill data which is one of the inputs to multiplexer 37b. An output of MEMC/DBEC 77 is also provided onto the line 33, i.e., the A-BUS FA line. The output from the multiplexer 37b is provided through a state device 42. The output of state device 42 forms the E-BUS FA buses that couple to all the CPUs.

Each of the blocks 69, 71, 73, 75, 77 and 79 provide an input to the resource check 67 which utilizes this information and the presence of a command on the bus 36 to arbitrate between the different inputs which want access to the multiplexer 37b. It grants access via its output lines coupled through state devices 67a and 67b. One set of output lines is the output lines 83 leading from the resource check 67 to each of the blocks 69, 71, 73, 75, 77 and 79. The other are the lines 61 and 85 leading, respectively, to the port logic 49 and the port select logic 65.

Figure 3:
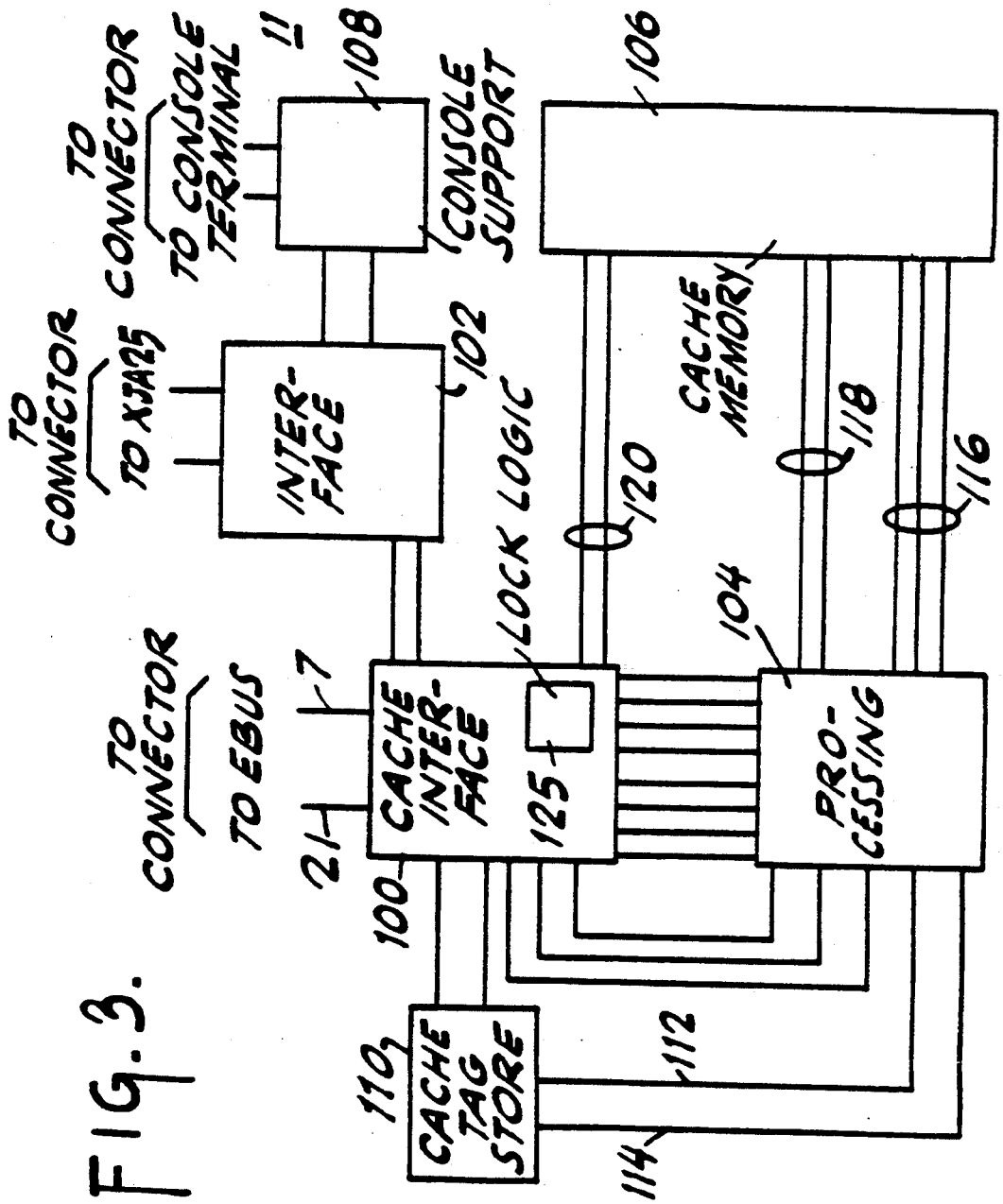
FIG. 3 is a block diagram of one of the CPU nodules in FIG. 1.

FIG. 3 is a more detailed block diagram of one of the CPU modules 11-14 (in this case CPU 0) shown in FIG. 1. The CPU module 11 has three major component chips including an interface (X) chip 102, a processor (P) chip 104 and cache interface (CF) chip 100. The processing chip or P chip 104 is coupled with a cache memory 106. The processing chip 104 further couples with a cache tag store 110 by which it requests an address over line 112 and receives a tag entry via line 114. The P chip 104 makes use of lines 116 to enable data to be written to the cache memory 106. Further, lines 118 provide the data and error correction codes (ECC) from the cache memory 106 to the processing chip 104.

The cache memory 106 is shown in this example composed of random access memories (RAMs). The cache 106 further receives data and ECC information from the CF chip 100 over lines 120. The operation of a cache memory 106 along with its associated cache tag store 110 is well known to those skilled in the art and will not therefore be discussed.

The X chip 102 provides an interface to the XJA bus adaptor 25 (FIG. 1). The X chip 102 provides outputs to the CF chip 100 and receives inputs therefrom. Further, the X chip 102 interfaces with a console support block 108 for interfacing with a console terminal 26 (FIG. 1).

The CF chip 100 provides outputs to the cache tag store 110 including new tag entry and write enable information. Further, the CF chip 100 receives address and data operands, along with parity information, from the processing chip 104. The CF chip 100 couples the CPU with the E BUS TA and E BUS FA as indicated by bus lines 17 and 21, respectively.

Interlock Queueing

Referring back to FIG. 1, it is often desirable for some device such as one of the CPU modules 0-3 or an I/O unit or device through the XJA adaptor to gain exclusive access to a particular unit or location of the memories 31a-31n. For example, one of the CPU modules 11-14 may desire to lock a block of data, a longword, a byte, etc., in one of the memory modules 31a-31n. To do so, the device generates a lock request in the form of a READ LOCK command. This command will lock the particular memory location allowing the resource exclusive access thereto. Once the location is locked no other CPU's lock request to that location will be allowed. Once the resource has completed its operations on the location, a WRITE UNLOCK command is generated to free the memory location. The precise operation of these commands is described below with respect to FIG. 4.

In the example of FIG. 1, there are four E BUS nodes, corresponding to CPU modules 0-3, from which lock requests can originate. Still further, as seen from FIG. 3, each node on the E BUS, in this case the CPUs, also includes more than one resource which may generate lock requests, for example, the P chip 104 or the X chip 102. In this instance, the CF chip 100 functions to insure that neither the processing chip's 104 or X chip's 102 lock requests are locked out from being serviced. Similarly, the central unit 15 must insure that no lock out occurs for any of the nodes on the E BUS.

Referring to FIG. 2, the central unit 15 makes use of lock block 71 which includes lock logic to be described below in FIG. 4, to insure that no node is ever locked out from having its lock request satisfied. Further, the CF chip 100 in the CPU shown in FIG. 3 includes lock logic 125 for insuring that neither the CPU nor the X chip are ever locked out from having their lock requests satisfied. In this manner as will be fully described below, a hierarchy of lock out avoidance mechanisms, i.e., lock logic 71 and lock logic 125, are utilized to insure that every lock request is eventually serviced.

Referring to FIG. 2, lockout avoidance is performed at the highest level by the lock logic 71 in the central unit 15. The use of the central unit 15 to keep track of lock locations and to avoid lockouts provides an advantage over conventional multi-drop buses wherein each CPU or memory coupled to the bus must keep track of the locked data. Because the central unit 15 receives all lock requests and maintains lock registers, it provides the opportunity to implement centralized queueing mechanisms to avoid the lockouts.

Figure 4:
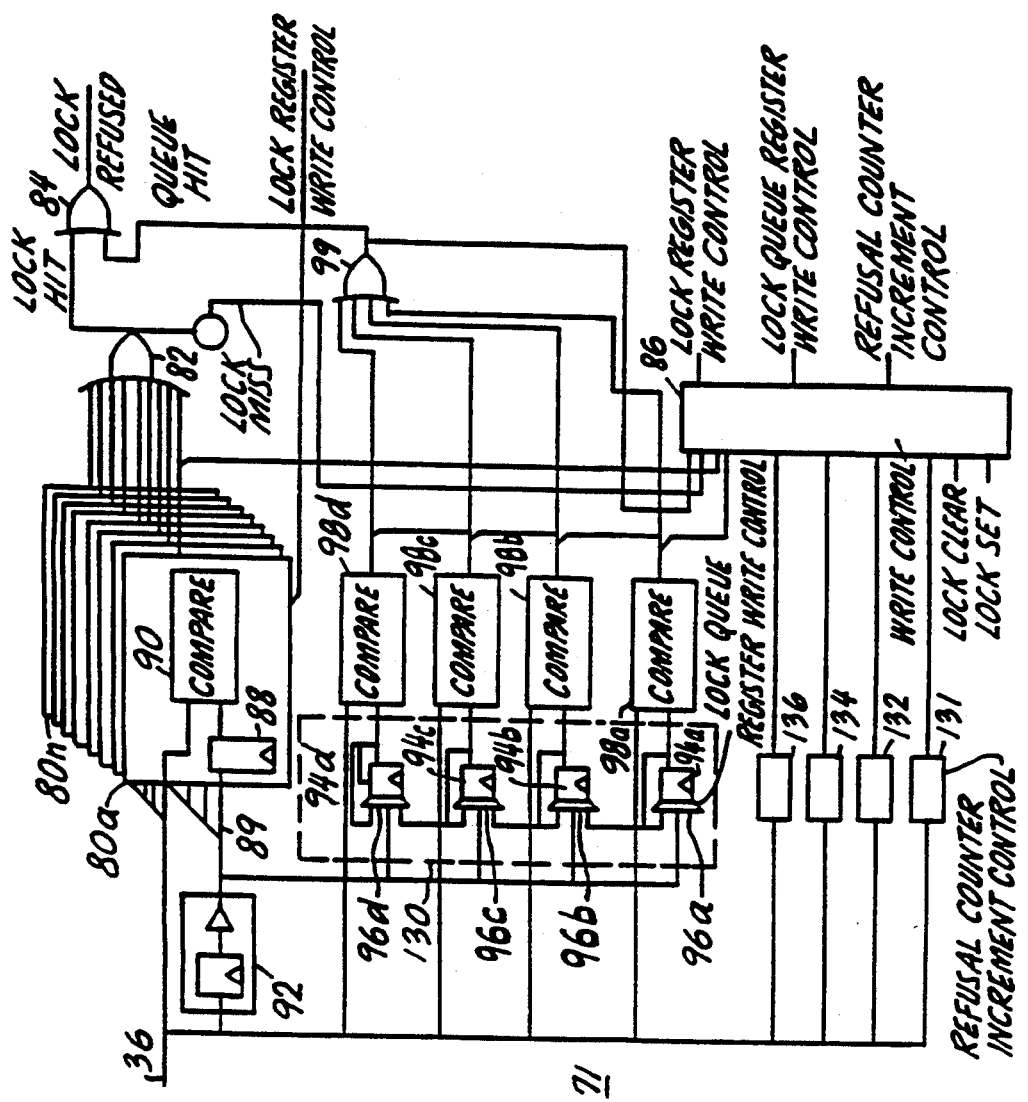
FIG. 4 is a detailed block diagram of the lock logic of the present invention.

FIG. 4 describes in greater detail the lock logic 71. The lock logic 71 includes a predetermined number of lock registers 80a-80n, in the example shown "n" equals eight, but it is understood to depend upon the requirements of the system. Each of the lock registers 80a-80n stores the address of a particular memory location to be locked. For this example having eight lock registers, up to eight memory locations can be locked at any given time. The outputs from each of the register blocks 80a-80n are the result of a compare performed between each of the lock registers and the address of an incoming lock request on bus 36. The output of OR gate 82 provides either a LOCK HIT or LOCK MISS signal. The LOCK HIT signal is provided to further logic 84 which outputs a LOCK REFUSED signal to the resource check 67 in the arbiter 51 (FIG. 2). The LOCK MISS signal is provided as an input to a write control 86.

Each lock register 80a–80n includes a register 88 and a comparator 90. The register 88 stores an address of the memory location desired to be locked along with an indication of its validity, i.e., locked or unlocked, as shown in FIG. 4a. The register 88 is composed of several fields including a lock register valid bit field, node source ID, and byte addresses. The register 88 is enabled via commands from the write control block 86.

The command and address received from the schedule logic 66 (FIG. 2) over bus 36 is provided in parallel to the comparators 90 in each of the lock registers 80a–80n. The command and address are further provided to delay logic 92 which has an output coupled in parallel to the registers 88 in each of the lock registers 80a–80n. The output from the registers 88 are provided as another input to the comparators 90 in each of the lock registers. The output from the comparators 90 in each of the lock registers is then provided to the OR gate 82 mentioned above.

A lock queue, shown generally by dotted line 130, is composed of several state devices 94a–94d chained together. The number of entries in the lock queue (in this example four) correspond to the number of nodes. An example of one of the state devices 94a–94d is shown in greater detail in FIG. 4b functioning as a lock queue register entry including a lock queue register valid bit and node source ID bits. Coupled with each state device 94a–94d is an associated multiplexer 96a–96d. The registers 94a–94d and multiplexers 96a–96d are coupled together to form the lock queue 130 which functions as will be described below. A comparator 98a–98d is associated with each individual state device and multiplexer 94, 96 and receives an input therefrom. Further, the comparator 98 receives an input from the command address bus 36. Each of the comparators 98a–98d provides an output to OR gate 99. The OR gate 99 provides inputs to OR gate 84 and to write control logic 86. The write control logic 86 also receives inputs from each comparator 90 in the lock register blocks 80a–80n and each comparator 98a–98d associated with the lock queue 130.

The write control logic 86 provides a LOCK REGISTER WRITE CONTROL signal to each of the registers 88 in the lock registers 80a–80n. Further, the write control block 86 provides a LOCK QUEUE REGISTER WRITE CONTROL signal to enable the multiplexers 96a–96d associated with state devices 94a–94d to operate in accordance with the lock queue 130 design. Also, a REFUSAL COUNTER INCREMENT CONTROL signal is provided from write control 86 to a plurality of refusal counters 131–136. Each refusal counter is associated with a node, such as CPU modules 0–3 (FIG. 1) in the system. The refusal counters 131–136 are incremented by signals from the write control 86. Once a particular refusal counter reaches a predetermined limit, an END OF COUNT signal is provided to the write control 86. The predetermined limit in the refusal counter is optimized for the best performance for lock requests in the system. The write control 86 further receives from the arbiter 51 (FIG. 2) a LOCK CLEAR and LOCK SET signal.

In operation, assuming all of the lock registers 80a–80n are available for use, a READ LOCK command and an associated memory address to be locked are provided in parallel to the comparators 90 in each of the lock registers 80a–80n. Each of the respective comparators 90 compares the address with the address previously stored in its associated register 88. In this example, because each of the lock registers is initially empty, the comparators 90 do not generate any matches as an output to the OR gate 82. Therefore, the output from the OR gate 82 provides a LOCK MISS signal to the write control 86. The write control 86 then provides a LOCK REGISTER WRITE CONTROL signal to registers 88 to enable a particular one of the registers 88 in the lock registers 80a–80n and to set the valid bit. The particular block which is enabled by the LOCK REGISTER WRITE CONTROL signal is determined by a predefined protocol in the write control 86. By enabling the register 88 with the signal, the READ LOCK command stores its associated address in the register 88 from line 89 after having been provided as an input thereto from bus 36 through the delay logic 92. Further the write control 86 sets the valid bit in register 88 to indicate the memory location is locked. The delay logic 92 functions to sufficiently delay the command and address so as to arrive at the register 88 once the write control 86 generates its LOCK REGISTER WRITE CONTROL signal, enabling storage at a predetermined location. In this manner, up to eight lock addresses can be stored in the lock registers 80a–80n.

Associated with each READ LOCK command is a WRITE UNLOCK command and associated address. The WRITE UNLOCK command is necessary to unlock the particular memory location once the resource has finished its use. Referring back to FIG. 4, WRITEUNLOCK commands are never refused by the lock logic 71. A WRITE UNLOCK command and associated address on bus 36 provides a LOCK MISS output to the write control 86 which provides a LOCK REGISTER WRITE CONTROL signal to clear the valid bit in the particular register 88 in the lock register block 80a–80n corresponding to the WRITE UNLOCK command.

Once all of the lock registers are filled with valid addresses of locked locations, as indicated by the lock register valid bit in register 88 (FIG. 4a), then any subsequent lock requests will be refused. Similarly, if a lock request is generated for a particular memory location which is already locked, then that lock request will also be refused. For example, assuming a first READ LOCK command was allowed for address 00 in the memory, then one of the registers 88 will contain address 00 and its lock register valid bit will be set. If a subsequent READ LOCK command also desires to access address 00, then the one comparator 90 associated with the register 88 storing that particular address will generate a match signal to OR gate 82. The OR gate 82 thus provides a LOCK HIT signal to OR gate 84 which in turn outputs a LOCK REFUSED signal to the resource check 67 in the arbiter.

Referring back to FIG. 2, the LOCK REFUSED signal is provided as an input to the resource check 67 which enables multiplexer 37b to provide a retry signal on the particular E BUS 21–24 from which the READ LOCK command was generated.

Referring back to FIG. 4, when a match is generated from one of the comparators 90 in one of the lock registers 80a–80n, a signal is sent over line 200 to the write control 86. The match indicates that the memory location is currently locked. The write control 86 then provides a REFUSAL COUNTER INCREMENT CONTROL signal. The REFUSAL COUNTER INCREMENT CONTROL signal enables the particular refusal counter 130-136 associated with the node generating the READ LOCK command which was refused. This signal increments the counter.

Similarly, when all of the lock registers 80a-80n are filled with a valid address and not the address for which the lock is requested, then the LOCK MISS signal provided from OR gate 82 to the write control 86 will enable the REFUSAL COUNTER INCREMENT CONTROL signal. This is possible because the write control 86 internally tracks the number of valid lock registers and therefore knows when the lock registers 80a-80n are filled.

Once a refusal counter 131-136 has been incremented a predetermined number of times, the END OF COUNT signal is provided to the write control 86. This generates a LOCK QUEUE REGISTER WRITE CONTROL signal from the write control 86 to the lock queue 130. The node source ID and the lock queue register valid bit (FIG. 4b) are then loaded and set, respectively, into the top of the queue 94d by enabling the multiplexer 96d for the particular READ LOCK command and associated address from bus 36. This lock request then becomes the head of the lock queue 130. Once the lock queue 130 contains a valid entry, any subsequent lock requests from other nodes will be automatically refused (regardless of whether the other conditions for refusing locks are satisfied) and will be stored in the queue 130.

The LOCK QUEUE REGISTER WRITE CONTROL signal can implement several functions. These functions include a Hold signal, Update signal and Push To Top of Queue signal. These signals are described below with respect to the queue 130 operation.

The LOCK QUEUE REGISTER WRITE CONTROL signal is next input to multiplexer 96c which enables the second lock request to be stored in location 96c in the lock queue 130. If another lock request is generated from a node already stored in the lock queue 130, that request will then generate the LOCK QUEUE REGISTER WRITE CONTROL hold signal that enables the middle line of the multiplexers currently storing the same entry 94. This new request then is stored in the same queue position.

Each entry in the lock queue 130 is provided as an input to its associated comparator 98a-98d. Further, the information on bus 36 is also provided to each of the comparators 98a-98d. The output from the comparators 98a-98d are provided as parallel inputs to OR gate 99 which provides an output both to OR gate 84 (QUEUE HIT) and to write control 86.

The lock queue 130, as shown in FIG. 4, has as many entries as there are nodes coupled to the central unit 15. As used in the present example, the four entry lock queue, i.e., entries 94a-94d, is required because of the four possible E BUS nodes from which lock requests may originate. Again, as shown in FIG. 4b, each entry in the queue 130 is composed of two parts: a valid bit, indicating whether the entry is valid, and a slot ID which points to one of the E BUS CPU nodes.

Every time the head entry 94d of the lock queue 130 is serviced, i.e., its lock request is satisfied, the lock queue is pushed by the LOCK QUEUE REGISTER WRITE CONTROL push to top of queue signal enabling the lower input to the multiplexers 96a-96d. This has the effect of pushing the entries upward in the queue to create a new head of queue and making available the bottom entry 94a. For this reason, the lock queue 130 need only be of a depth equal to the number of nodes on the E BUS which can generate lock requests.

An example of the lockout avoidance mechanism operation will now be given. Lock requests are generated from the various nodes (FIG. 1) in the form of READ LOCK commands and an associated address location and are received by the central unit 15 through their respective port logics 49a. The request passes through the scheduling logic 66 and into the lock logic 71 (FIG. 2) on bus 36. As long as the lock request is not refused by the lock logic 71, the request does not enter the lock queue 130 (FIG. 4). However, assuming the lock request from node 0, i.e., CPU 0, is refused because the particular location in memory has already been locked or because no free lock registers 80a-80n are available for allocation to the lock request, then the write control 86 increments the refusal counter 131-136 for the particular node, in this case CPU 0. After a predetermined period of time, CPU 0 again retries its lock request. If the lock request from CPU 0 is again refused, its respective refusal counter is incremented once more. Once a lock request has been refused a predetermined consecutive number of times while the lock queue 130 remains empty, the write control 86 then places the identification for the particular node at the head of the lock queue 130. Only the node ID (FIG. 4b) is stored in the lock queue and not the address of the lock request that was refused.

Because the lock queue 130 is no longer empty, a subsequently arbitrated lock request from any other node will be refused and will also enter the lock queue 130 in the order in which it is serviced by the arbiter 51. Once a lock request from the head of the queue is serviced, the next waiting lock request in the lock queue 130 is pushed to the head of the queue via the LOCK QUEUE REGISTER WRITE CONTROL push to top of queue signal and the operation of the multiplexers 96a-96d.

This operation assures that whenever the lock queue 130 is empty, it is difficult to enter the lock queue 130 because the lock requests from a particular node must be refused a predetermined consecutive number of times. Therefore, the lock queue 130 is predominantly kept empty, assuming the refusal counter is set at a high enough value. However, once the lock queue 130 has an entry, all future lock requests are serviced strictly by their lock queue position, i.e., the head of the queue gets satisfied first, the second entry is satisfied next, etc. This operation continues until the lock queue 130 is again empty.

In sugary, the lock logic generates a LOCK REFUSED signaling response to a READ LOCK command from a node in three instances: 1) the lock queue is not empty and the requesting node is not the head of the queue; 2) no free lock registers are available; or 3) the particular memory block desired is already locked.

Because the lock requests are unconditionally queued in the lock queue 130 once the lock queue 130 is no longer empty, the address of the refused lock request is not important. So long as each node guarantees that it will never lockout any of the multiple sources of lock requests it receives, the central unit 15 guarantees that every lock request, regardless of its address, has a fair and equal chance of entering the lock queue 130 and hence, eventually reaching the head of the lock queue 130 for servicing.

The above description guarantees that no lockout will occur at the highest level in the system. However, to guarantee that lockouts do not occur anywhere in the system, lockout avoidance mechanisms must be in place wherever multiple sources of lock requests are generated. Thus, while the central unit 15 avoids lockouts for each of the nodes, i.e., the CPUs coupled thereto, via lock logic 71, a lockout avoidance mechanism is necessary in each node to avoid lockouts of other sources of lock requests.

Referring again to FIG. 3, the CPU block diagram includes the CF chip 100 which has a lock logic 125. This lock logic 125 prevents lockouts of either the processor chip's 104 or X chip's 102 lock requests. The lock logic 125 operates similarly to the lock logic 71 shown in FIG. 2. Because the lock queue 130 in the central unit 15 does not store addresses nor whether the lock request was from either the X chip or the processor chip 104, it is possible that either the processor chip or the X chip can lock the other out from ever having their lock request satisfied.

FIG. 5 illustrates the two entry queue used in the lock logic 125 of the CF chip 100. In this example, the queue 134 includes two entries, each of which includes two bits: 1) an entry valid bit; and 2) a source ID bit, e.g., X chip or processor chip.

In operation, as long as a lock request from the processor chip or X chip is not refused by the central unit 15, the queue 134 remains empty. However, once a lock request from, for example, the processor chip, is refused by the central unit 15, the lock request immediately enters the head of the queue 134. From this point onward, only the processor chip can have its lock requests forwarded onto the E BUS (and hence to the central unit 15) from the CF chip 100. If, for example, the X chip requests a lock, this request will enter the queue 134 behind the processor chip's entry. Further, the X chip's lock requests will internally be refused by the CF chip 100 and thus prevented from going onto the E BUS.

Once the head of the queue, in this example the processor chip entry, is eventually satisfied by the central unit 15, it is popped out of the queue 134 and the X chip's lock request becomes the new head of the queue 134.

The method used in the CF chip 100 for avoiding lockouts is as follows. If the queue 134 is empty, both the processor and X chip can send their respective lock requests to the central unit 15 via the E BUS 17-20. If a lock request is refused by the central unit 15, then the source of the lock request, i.e., processor or X chip, along with whether it is valid or invalid, is entered into the queue 134. It is important to note that if the source is already stored in the queue, it will maintain its queue position.

The protocol used in the CF chip to avoid lockouts is essentially similar to the lock queue 130 used in the central unit. However, in this instance there is no need to implement a refusal counter in the CF chip 100, because the frequency at which lock requests are generated from the X chip at the CPU level is not great enough to require the use of a refusal counter.

What is claimed is:

1. A lockout avoidance circuit for a plurality of nodes generating lock requests for a shared resource, comprising a queue including:
  a plurality of registers pipelined together, a first of said registers being the head of the queue and the last of said registers being the tail of the queue;
  means for counting lock requests that have been refused from at least one of said nodes;
  means for enabling said queue to store a lock request from said node at the tail of the queue after a predetermined number of lock requests from said node have been refused and storing all subsequent lock requests from any other of said nodes at the tail of the queue in the order in which they are registered; and
  said means for enabling operating said queue to advance the stored lock requests toward the head of said queue each time the lock request at the head of the queue is serviced.

2. A lockout avoidance circuit according to claim 1, wherein:
  the means for counting refused lock requests comprises a plurality of counters coupled to said means for enabling, each one of said counters being associated with one of said nodes;
  a count signal is provided to said means for enabling from one of said counters in response to the counter having reached a predetermined number of refused lock requests; and
  said means for enabling stores a particular lock request from one of said nodes in the queue in response to the count signal associated with said node.

3. A lockout avoidance circuit according to claim 2 further comprising means for storing all subsequent lock requests from any of said nodes in the queue after the means for enabling has received the count signal from a counter.

4. A lockout avoidance circuit according to claim 3 wherein each of said registers comprises:
  a valid indication field; and
  a node source ID field.

5. A method for avoiding lockout of lock requests for a particular resource in a system, said lock requests generated from a plurality of nodes coupled to a central location, the method comprising the steps of:
  counting at a central location the number of times a particular node is refused a lock request to a particular resource;
  storing all lock requests for any system resource subsequent to a predetermined number of lock requests from the particular node that have been refused; and
  servicing, serially in the order stored, all lock requests until all lock requests are satisfied.

6. A method for avoiding lockout of lock requests generated from a plurality of nodes coupled to a central location, the method comprising the steps of:
  incrementing a counter associated with a particular one of the nodes when a lock request from said particular node is refused in the central location;
  generating an end of count signal from said counter when the lock request is refused a predetermined number of times;
  storing the lock request as a head entry in a queue once the end of count signal is generated;
  subsequently storing any further lock requests from different nodes as further entries in said queue once the queue contains a head entry; and
  operating said queue to the entries in the order in which they are placed in the queue.

7. A method according to claim 6 wherein the step of storing the lock request comprises generating a first signal to enable a first register in said queue to store the lock request.

8. A method according to claim 7 wherein the step of subsequently storing comprises generating a second signal to enable a next register in said queue to store the next lock request from a different node.

9. A method according to claim 8 wherein the step of operating the queue comprises:
generating a third signal to push said queue once the head entry is serviced such that the next entry in the queue becomes the head entry; and
continuing to generate the third signal each time the head entry is serviced until the queue is empty.

10. A method according to claim 9 wherein the step of operating said queue is carried out by a control circuit.

11. An apparatus for avoiding lockouts of lock requests in a multi-level hierarchical system, comprising:
a first lockout avoidance circuit in the highest hierarchical level of said system, said first lockout avoidance circuit guaranteeing that no lockout occurs for lock requests received at said highest hierarchical level, said first lockout avoidance circuit including:
a) first means for providing a first level lock request refusal signal if a predetermined number of lock request refusals occur, and
b) a first level lock queue for storing highest hierarchical level requester information in response to said first level lock request refusal signal; and
a second lockout avoidance circuit in the next highest hierarchical level of the system, said second lockout avoidance circuit guaranteeing that no lockouts occur at the next highest level, said second lockout avoidance circuit including:
a) second means for providing a second level lock request refusal signal if second level lock request refusals occur, and
b) a second level lock queue for storing next highest hierarchical level requester information in response to said second level lock request refusal signal.

12. A method for avoiding lockouts of lock requests in a multi-level hierarchical system, comprising the steps of:
operating a first lockout avoidance circuit in the highest hierarchical level of said system, said first lockout avoidance circuit guaranteeing that no lockout occurs for lock requests received at said highest hierarchical level and including the steps of:
a) providing a first level lock request refusal signal if a predetermined number of first level lock request refusals occurs, and
b) storing highest hierarchical level requester information in a first level lock queue in response to said first level lock request refusal signal; and
operating a second lockout avoidance circuit located in the next highest hierarchical level of the system, said second lockout avoidance circuit guaranteeing that no lockouts occur at the next highest hierarchical level and including the steps of:
a) providing a second level lock request refusal signal if second level lock request refusals occur, and
b) storing next highest hierarchical level requester information in a second level lock queue in response to said second level lock request refusal signal.

13. A circuit for servicing lock requests for memory locations generated from a plurality of nodes, comprising:

a plurality of lock registers, each of the lock registers including a storage device and a comparator having first and second inputs, said lock requests being provided to the first input of the comparator and to an input of the storage device, an output of the storage device being coupled to the second input of the comparator;
a lock queue coupled to said lock registers, the lock queue receiving lock requests at its inputs, the lock queue including a plurality of queue registers;
a control circuit coupled to the lock registers and lock queue for controlling the circuit operation;
a plurality of counters each providing a count signal to the control circuit, the number of counters and queue registers equalling the number of nodes from which lock requests are generated;
said control circuit including
a first signal for operating the lock registers;
a second signal for operating the lock queue; and
a third signal for operating the counters.

14. A circuit according to claim 13 wherein said lock queue further comprises:
a plurality of multiplexers, one of the multiplexers being associated with each one of the queue registers, said multiplexers receiving the second signal for operating the lock queue.

15. A circuit according to claim 14 wherein the plurality of lock registers provide either a lock refused or lock miss signal in response to a lock request; and
the lock miss signal being forwarded to the control circuit to activate the first signal for storing the lock request.

16. A circuit according to claim 15 wherein the lock refused signal enables the control circuit to generate the third signal to the respective counter associated with the node generating the lock request.

17. A circuit according to claim 16 wherein the counters are set to a predetermined value, said third signal incrementing the respective counter.

18. A circuit according to claim 17 comprising:
an end of count signal output from said counters once they reach their predetermined value, the end of count signal provided to the control circuit to activate the second signal.

19. A circuit according to claim 18 wherein each queue register comprises:
a valid indication field; and
a node source ID field.

20. A circuit according to claim 19 wherein each storage device includes:
an address field;
a node source ID field; and
a valid indicator.

21. A circuit according to claim 20 wherein the first signal selectively sets and clears the valid indicator.

22. A lockout avoidance circuit for a plurality of nodes generating lock requests for a shared resource, comprising:
a queue having a head and a tail;
means for counting lock requests that have been refused from at least one of the nodes;
means for enabling the queue to store a lock request from the node at the tail of the queue after a predetermined number of lock requests from the node have been refused, and storing all subsequent lock requests from any other of the nodes at the tail of the queue in the order in which they are requested;
the means for enabling operating the queue to advance the stored lock requests toward the head of the queue each time the lock request at the head of the queue is serviced.

* * * * *